(12) United States Patent
Lee (10) Patent No.: US 11,969,114 B2
(45) Date of Patent: Apr. 30, 2024

(54) SMART JUICER SYSTEM FOR GREEN VEGETABLE JUICE AND OPERATING METHOD THEREOF

(71) Applicant: ANGEL Co., Ltd., Busan (KR)

(72) Inventor: Kwang Hui Lee, Busan (KR)

(73) Assignee: ANGEL Co., Ltd., Busan (KR)

( * ) Notice: Subject to any disclaimer, the term of this patent is extended or adjusted under 35 U.S.C. 154(b) by 578 days.

(21) Appl. No.: 17/105,219

(22) Filed: Nov. 25, 2020

(65) Prior Publication Data

US 2022/0160160 A1  May 26, 2022

(30) Foreign Application Priority Data

Nov. 23, 2020 (KR) .......................... 10-2020-0158085

(51) Int. Cl.
*A47J 19/06* (2006.01)

(52) U.S. Cl.
CPC ..................................... *A47J 19/06* (2013.01)

(58) Field of Classification Search
CPC .......... A47J 19/06; A47J 19/02; A47J 36/321; A47J 43/04
USPC ............................................................ 99/510
See application file for complete search history.

(56) References Cited

U.S. PATENT DOCUMENTS

| 5,906,154 A * | 5/1999 | Yoon | B30B 9/12 100/145 |
| 8,826,811 B2 * | 9/2014 | Kim | A47J 19/025 99/509 |
| 9,815,191 B2 * | 11/2017 | Oleynik | G05B 19/42 |
| 10,022,614 B1 * | 7/2018 | Tran | G16H 50/20 |
| 10,325,596 B1 * | 6/2019 | Tran | G10L 15/1822 |
| 10,942,932 B2 * | 3/2021 | Doble | G06F 16/284 |
| 2006/0214765 A1 * | 9/2006 | Pitchers | G06K 19/07345 340/3.4 |
| 2011/0110180 A1 * | 5/2011 | Snider | B01F 21/221 222/85 |
| 2014/0095479 A1 * | 4/2014 | Chang | G06Q 30/0631 707/E17.005 |

(Continued)

FOREIGN PATENT DOCUMENTS

| EP | 3366175 A1 | 8/2018 |
| KR | 20130135677 A | 12/2013 |

(Continued)

*Primary Examiner* — Eric S Stapleton
(74) *Attorney, Agent, or Firm* — Bridgeway IP Law Group, PLLC; Jihun Kim (57) ABSTRACT

A smart juicer system includes: a juicer configured to make green vegetable juice by extracting juice from input ingredients, and generate juice extraction information including at least one of time information about the juice extraction, identification information about the input ingredients subjected to the juice extraction, a recipe based on the juice extraction, or making conditions of the juice extraction; and a terminal processor including a user interface for receiving an input about whether a user drinks green vegetable juice, a communication module for data communication with the juicer, and a terminal processor configured to generate information about the user's intake history of green vegetable juice based on the intake information and the juice extraction information obtained from the juicer through the communication module.

15 Claims, 7 Drawing Sheets

(56) References Cited

U.S. PATENT DOCUMENTS

| | | | | |
|---|---|---|---|---|
| 2015/0290795 A1* | 10/2015 | Oleynik | ................ | B25J 9/0081 |
| | | | | 700/257 |
| 2015/0374025 A1* | 12/2015 | Evans | .................... | A23N 1/02 |
| | | | | 99/495 |
| 2017/0292908 A1* | 10/2017 | Wilk | .................... | G01N 21/359 |
| 2018/0029222 A1* | 2/2018 | Oleynik | ................ | G05B 19/42 |
| 2018/0043526 A1* | 2/2018 | Oleynik | ................ | G05B 19/42 |
| 2018/0133583 A1* | 5/2018 | Tran | ...................... | G16H 30/20 |
| 2018/0147718 A1* | 5/2018 | Oleynik | ................ | A47J 36/321 |
| 2018/0257219 A1* | 9/2018 | Oleynik | ................ | B25J 9/0081 |
| 2019/0001288 A1* | 1/2019 | Ciepiel | .............. | B01F 35/2209 |
| 2019/0080128 A1* | 3/2019 | Evans | ................ | G06Q 10/087 |
| 2019/0162585 A1* | 5/2019 | Wallace | ................ | G06F 3/048 |
| 2019/0381654 A1* | 12/2019 | Oleynik | ................ | B25J 9/0081 |
| 2020/0342781 A1* | 10/2020 | Kraut-Reinkober | ........................ | |
| | | | | A47J 27/004 |
| 2020/0344086 A1* | 10/2020 | Kraut-Reinkober | ........................ | |
| | | | | H04L 12/2829 |

FOREIGN PATENT DOCUMENTS

| KR | 20180023080 A | 3/2018 |
|---|---|---|
| KR | 20190031649 A | 3/2019 |
| KR | 2019-0058747 A | 5/2019 |
| KR | 1020190058747 A | 5/2019 |
| KR | 20190100525 A | 8/2019 |
| KR | 20210069860 A | 6/2021 |

\* cited by examiner

SMART JUICER SYSTEM FOR GREEN VEGETABLE JUICE AND OPERATING METHOD THEREOF

CROSS-REFERENCE TO RELATED THE APPLICATION

This application is based on and claims priority under 35 U.S.C. § 119 to Korean Patent Application No. 10-2020-0158085 filed on Nov. 23, 2020 in the Korean Intellectual Property Office, the disclosure of which is incorporated by reference herein in its entirety.

BACKGROUND

Field

The disclosure relates to a smart juicer system and an operating method thereof, and more particularly to, a juicer system, which provides a green vegetable juice service customized for an individual or a family based on big data about effectiveness of green vegetable juice, and a method of operating the same.

Description of the Related Art

In this specification, the term 'juicer (or juicer for green vegetable juice)' will be used to cover all apparatuses capable of making green vegetable juice. Therefore, the juicer in this specification includes a blender, a mixer, a juice extractor, and the like apparatuses called by different names.

The juicer has been on the market with compact hardware and software to make green vegetable juice. For example, only compact elements such as a blade, a motor, a user interface, a driving MICOM, etc. are enough for the juicer by which a consumer can make desired green vegetable juice in person.

As it says 'good meals will keep you healthy', the green vegetable juice may be good for a specific disease according to its recipes. Then, if management is possible throughout a cycle: a choice of ingredients for green vegetable juice, juice extraction, juice intake, and effectiveness check, in other words, when recipes for green vegetable juice customized for individuals are optimally selected, better intake of the green vegetable juice is guided, and feedback on the intake is continuously given, a consumer can be healthier by eating the green vegetable juice and his/her satisfaction with the juicer will be higher.

A conventional juicer does not have enough specifications for collecting and processing data and generating and managing information, and thus has been required to have new functionality by interworking with computing apparatuses based on information and communications technology (ICT).

To meet a part of such needs, Korean Patent Publication No. 2019-0058747 has introduced the extractor controlling technology so that a user who wears a smart watch can choose juice based on the user's biometric information. Here, the biometric information refers to heart rate, the number of steps taken in walking, and calorie consumption of the user who wears the smart watch, and such information is not a criterion for substantially choosing the juice. This related art seems to be focused on convenience for a user to select favorite juice by providing an option menu for the juice.

SUMMARY OF THE INVENTION

The disclosure is conceived to solve the foregoing problems of the related art, and an aspect of the disclosure is to provide a smart juicer system, which provides a recipe for green vegetable juice customized for a consumer based on big data about effectiveness of green vegetable juice to thereby improve the consumer's satisfaction and health, and a method of operating the same.

Further, an aspect of the disclosure is to provide a smart juicer system, which can collect and process various pieces of data and generate information to make an optimal recipe for green vegetable juice customized for a consumer and to continuously perform calibration, and a method of operating the same.

According to an embodiment of the disclosure, there is provided a smart juicer system including: a juicer configured to make green vegetable juice by extracting juice from input ingredients, and generate juice extraction information including at least one of time information about the juice extraction, identification information about the input ingredients subjected to the juice extraction, a recipe based on the juice extraction, or making conditions of the juice extraction; and a terminal processor including a user interface for receiving an input about whether a user drinks green vegetable juice, a communication module for data communication with the juicer, and a terminal processor configured to generate information about the user's intake history of green vegetable juice based on the intake information and the juice extraction information obtained from the juicer through the communication module.

Here, the juicer may include an image sensor configured to capture an image of the input ingredients; and a juicer processor configured to identify identification information about the input ingredients based on the image captured by the image sensor, the juicer may include a container at which the image sensor is positioned to capture the image of the input ingredients; and a weight sensor configured to measure weight of the container, and the container may include partitioned spaces in which a plurality of heterogeneous input ingredients are placeable. Further, the image sensor may be installed in an inlet for the input ingredients to be subjected to the juice extraction and captures an image when the input ingredients are put into the inlet, and the juicer processor may be configured to identify the weight of the input ingredients from the image of the input ingredients.

Further, the juicer may include at least one of a clock for specifying the juice extraction time, a user interface for receiving the juice extraction information, or a communication module.

Further, the terminal processor may be configured to provide an inquiry about the intake to a user and receive intake check information from the user through the user interface, and the terminal processor may be configured to specify information about the green vegetable juice drunk by the user by comparing the intake check information and the juice extraction time and generate information about an intake history of the green vegetable juice.

The smart juicer system may further include a server configured to recommend a recipe for personalized green vegetable juice based on personal information, wherein the terminal processor is configured to receive the recipe for personalized green vegetable juice by providing the personal information input through the user interface to the server, and provide the received recipe for personalized green vegetable juice to the user through the user interface or the juicer through the communication module.

Further, the terminal processor or the server may be configured to prepare recipes for personalized green vegetable juice for members of a user group into which a plurality of users who share the juicer are grouped, and generates a common recipe customized for the user group based on the recipes for personalized green vegetable juice for the respective members. Here, the terminal processor or the server may be configured to generate a common recipe customized for the user group based on overlapped ingredients from the recipes for personalized green vegetable juice for the respective members. Further, the terminal processor or the server may be configured to generate a common recipe customized for the user group based on a recipe for green vegetable juice personalized for a member having high priority according to preset priorities of the members in the user group. Further, the terminal processor or the server may be configured to generate a common recipe customized for the user group by reflecting information about prohibited ingredients for a member of the user group. The members may be grouped into a plurality of user groups and a common recipe customized for each of the user groups may be generated, based on common attributes between the members of the user group or the recipe respectively personalized for the members.

Further, the terminal processor may be configured to receive a user's vitality or condition information through the user interface, and perform calibration with regard to the recipe for personalized green vegetable juice based on the user's vitality or condition information. Here, the calibration may include at least one of modification in a mixture ratio of input ingredients included in the recipe, change in the input ingredients of the recipe, or change in intake or frequency of the recipe for personalized green vegetable juice. Further, the condition information may include at least one of a user's fart frequency, bowel movement frequency, or bowel movement, and the vitality information may include information about a qualitative life pattern or a quantitative numerical value or input by a user.

Further, the terminal processor may be configured to receive diagnosis information about intake results of the green vegetable juice from the user through the user interface, and the terminal processor may be configured to obtain diagnosis information including at least one of blood pressure, blood glucose, or blood state from an external diagnosis apparatus or an external medical server. The smart juicer system may further include a server configured to update a recipe for green vegetable juice customized for the user based on the diagnosis information.

According to an embodiment of the disclosure, there is provided a method of operating a smart juicer system, including: receiving personal information about health conditions from a user through a user terminal; by a server, generating a recipe for personalized green vegetable juice for the user based on the received personal information; by the user terminal, generating information about an intake history of green vegetable juice based on the recipe for personalized green vegetable juice; collecting a user's condition information from a user through the user terminal; and calibrating the recipe for personalized green vegetable juice based on the condition information.

The receiving the personal information through the user terminal may include receiving the personal information of a plurality of users; the generating the recipe for personalized green vegetable juice by the server may include generating a recipe for personalized green vegetable juice for each of the plurality of users; and the method may further include, by the server or the user terminal, generating a common recipe for green vegetable juice customized for the plurality of users, based on recipes for personalized green vegetable juice for the plurality of users, attributes of the plurality of users, and priorities of the plurality of users.

Further, the method may further include: by the juicer, making green vegetable juice by extracting juice from the input ingredients based on the recipe for personalized green vegetable juice; and by the juicer, generating juice extraction information including at least one of making time based on making the green vegetable juice, identification information about the input ingredients, the juice extraction conditions, or the recipe for personalized green vegetable juice, wherein the generating information about the intake history of the green vegetable juice includes generating information about the intake history of the green vegetable juice based on information about intake time when a user drinks the green vegetable juice, and juice extraction information of the made green vegetable juice. The method may further include: capturing an image of the input ingredients through an image sensor; measuring weight of the input ingredients; and storing the juice extraction information according to whether the input ingredients matches the recipe for personalized green vegetable juice based on the image and weight of the input ingredients.

BRIEF DESCRIPTION OF THE DRAWINGS

The above and/or other aspects will become apparent and more readily appreciated from the following description of embodiments, taken in conjunction with the accompanying drawings, in which.

DETAILED DESCRIPTION OF EMBODIMENTS

Below, embodiments of the disclosure will be described in detail with reference to accompanying drawings.

Figure 1:
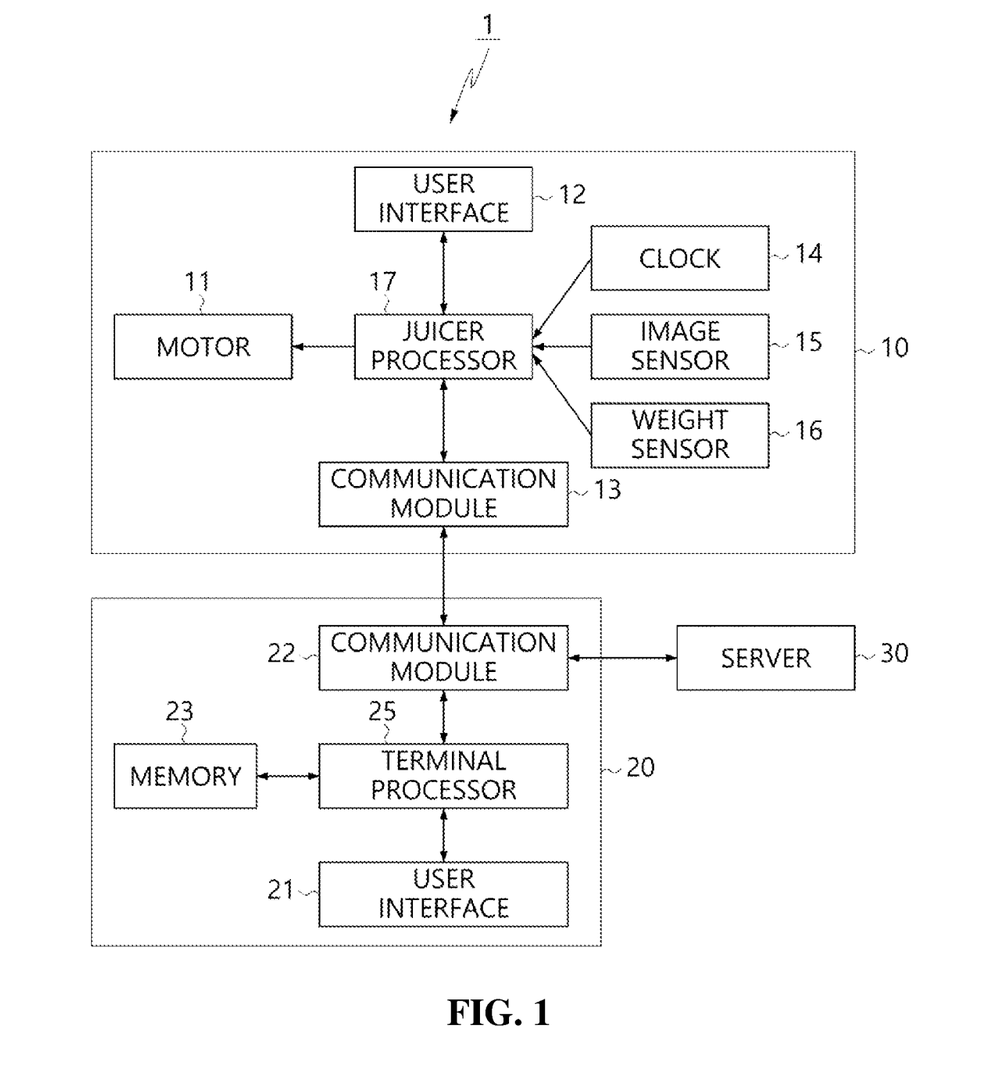
FIG. 1 is a block diagram of a smart juicer system according to an embodiment of the disclosure.

FIG. 1 is a block diagram of a smart juicer system according to an embodiment of the disclosure.

Referring to FIG. 1, according to an embodiment of the disclosure the smart juicer system 1 includes a juicer 10, a user terminal 20, and a server 30.

The juicer 10 refers to an apparatus capable of making green vegetable juice like a blender, juicer, etc., and thus includes screws, pressing gear or a blade, a motor 11, a user interface 12, a communication module 13, etc. which are well known as those provided in the existing juicer, blender or the like apparatus.

For example, the juicer 10 according to an embodiment of present invention may comprise extracting means with a pressing gear and a screw formed on a spiral, and a motor 11 equipped with a reduction gear. The extracting means may be connected to the output shaft of the reduction gear and can juice the green juice material as it rotates according to the drive of the motor 11. The user interface 12 may include input means for entering information such as buttons, keypad, etc. The user interface 12 may further include display means to display various information, including input menus, processing results, etc. The communication module 13 is for data communication with user terminals and can be implemented with various communication modules such as Wi-Fi, Bluetooth, NFC (Near Field Communication), Zigbee, IR (Infrared Ray), RF (Radio Frequency), etc.

Referring to FIG. 1, the juicer 10 according to an embodiment of present invention further includes a clock 14, an image sensor 15, a weight sensor 16, and a juicer processor 17. The clock 14 is for measuring juice extraction time information and can be implemented by clock or a timer, etc. The image sensor 15, which is for capturing an image of input materials, can be implemented by CMOS, CCD, or camera. The weight sensor 16 is for measuring the weight of the input material and can be implemented as a scale, etc. including the load cell, etc. The juicer processor 17 is for controlling the overall operation of the juicer 10 and analyzing and processing the juice extraction information of the juicer 10, which can be implemented, in addition to processing modules for data processing, further including a I/O devices and memory in which the data and software are stored. The juicer processor 17 can execute software stored in memory to control one other component (e.g., hardware or software component) associated with the juicer processor 17 and can perform various data processing and computation. The juicer processor 17 can load and process commands or data received from other components (e.g., communications modules) into volatile memory, and store the resulting data in non-volatile memory.

The juicer 10 according to an embodiment of the disclosure is characterized in having a function of generating juice extraction information.

Here, the juice extraction information may include one or more pieces of information such as identification information about input ingredients, weight information about the input ingredients, elapsed time of juice extraction, a mixture ratio of a plurality of input ingredients, juice extraction conditions (temperature, wetness, torque of the motor, a spinning profile of the motor over time, pressing force, clearance of the screw, clearance of the pressing gear, etc.

Some pieces of data in juice extraction information are identified by control software of the juicer 10, and therefore the juicer itself may obtain the torque of the motor, the profile, clearance of the screw, the gear clearance and the like some juice extraction conditions. Further, the juice extraction time information may be obtained by a clock 14 or a timer provided in the juicer 10.

The information about the input ingredients among the juice extraction information may be obtained through peripheral devices such as an Internet of things (IoT) sensor, etc., and then provided to a juicer processor 17. Here, the peripheral devices may be a part of the juicer 10, and may be separated from the juicer 10 and connected to the juicer 10 through wired/wireless data communication. Internet of things (IoT) sensor may include an identification sensor or an image sensor for identifying the input material, or a weight sensor for weighing the input material.

For example, the identification information about the input ingredients may be obtained as an image through an image sensor 15, and the image is analyzed by the juicer processor 17 for controlling the juicer 10, thereby identifying the input ingredients. To identify the input ingredients through the image analysis, the image of the input ingredients is previous stored, and the input ingredients are identified based on various well-known algorithms for extracting shapes and colors from pixels of the images. Alternatively, the identification information about the input ingredients may be obtained by applying the image sensed in the image sensor 15 to an artificial intelligence (AI) model established through learning of shapes according to the input ingredients based on a deep learning method. Since the AI-based object identification algorithm has been realized through a work robot and a sensor in a food field and a farm, the AI-based object identification algorithm does not assert any special exclusiveness as publicly known technology and thus the disclosure can be embodied without any specific limits.

The weight information about the input ingredients may be obtained by a method of directly measuring the input ingredients or a deducing method.

The weight sensor 16 may include a load cell installed under a hopper into which the input ingredients will be put, or the input ingredients may be directly measured by the load cell before putting the ingredients into the hopper. Besides, a volume may be estimated from a shape image corresponding to the ingredients by the foregoing AI-based learning, and then weight may be deduced from the estimated volume. In terms of the AI algorithm, various learning methods may be optimally selected and applied to application fields. For example, the deep-learning method may be used in analyzing the image of the input ingredients, and an enhanced learning method may be properly used in deducing the weight.

The identification information and weight of the input ingredients enable the image to be analyzed by dividing the image according to spaces partitioned by partition walls when the image is captured by the image sensor 15 with the installed partition walls for putting the corresponding ingredients therein, and at the same time there may be used a container (not shown) in which the load cells are distributively installed so as to separately calculate the total weight and the weight of each individual partitioned space. Here, the container (not shown) may be installed with a communication module (not shown) that can provide measured weight information to the juicer processor 17 through wired/wireless communication.

Meanwhile, pieces of the juice extraction information may be obtained by a user's direct input and by data communication with an external apparatus, and the obtained pieces of information may be integrated by the juicer processor 17.

As described above, the juicer processor 17 obtains juice extraction information by the IoT sensor, some parts (e.g. the clock 14), internal control parameter, data communication with the external apparatus, a user's direct input, etc. according to data attributes of the juice extraction information, and integrates juice extraction information.

Referring back to FIG. 1, the user terminal 20 according to an embodiment of the disclosure includes a user interface 21, a communication module 22, a memory 23 and a terminal processor 25. Such a user terminal 20 may be embodied by any computing apparatus capable of supporting communication, like a mobile phone, a tablet computer, a personal computer (PC) terminal, etc. and a user application can be installed on the user terminal 20 to provide a service according to the present invention. The user may download and install the user application according to the present invention on the user terminal 20. The users may also access the file distribution server to download the user application or receive and download application from specific sites or people.

This embodiment illustrates the installation of an application for mobile devices.

The user interfaces 21 is for user interaction and may include input means for entering information such as a mouse, a keyboard, a button, and a keypad, and a display means for displaying various images and information, including input menus and processing results. The communication module 22 is for data communication with external devices, and can be implemented with various communication modules such as LTE, 5G, Wi-Fi, Bluetooth, NFC (Near Field Communication), Zigbee, IR (Infrared Ray), RF (Radio Frequency), etc.

The memory 23 is for storing various types of data and software and a user application according to the present invention, and may include a volatile memory and a nonvolatile memory. The terminal processors 25 analyze and process data by executing user applications stored in the memory.

The terminal processor 25 may control one other component (eg, hardware or software component) connected to the terminal processor 25 by executing the user application stored in the memory 23, and can perform various data processing and computation. The terminal processor 25 may load a command or data received from another component (eg, a communication module) into a volatile memory and process and analyze it, and store the result data in a nonvolatile memory.

The whole processes such as data analysis, data process, information generation, etc. of the terminal processor 25 will be described as divided according to functions.

Figure 2:
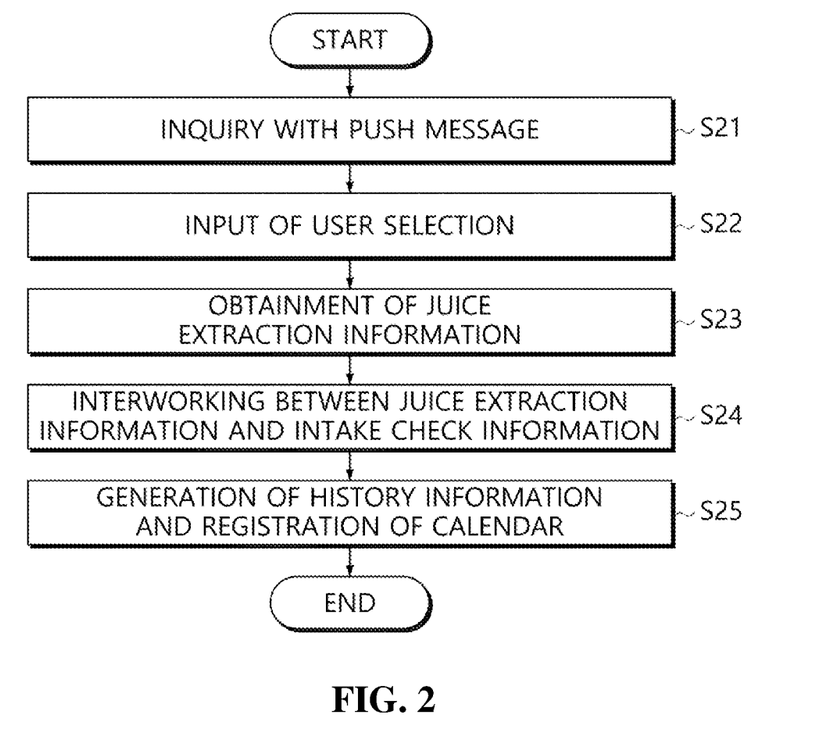
FIG. 2 is a flowchart showing a process of generating information about intake history of green vegetable juice according to an embodiment of the disclosure.

The first is a process for generating information about a user's intake history of green vegetable juice. To help understanding, the process will be described with reference to FIG. 2 showing a flowchart of a process for generating information about an intake history of green vegetable juice according to an embodiment of the disclosure.

The terminal processor 25 (non) periodically displays a push message for questioning a user about whether s/he drank the green vegetable juice (S21).

For example, buttons for selecting 'Yes' or 'No' are created while questioning a user about 'Did you drink the green vegetable juice today?' through the user application in a user's mobile phone. This is not inconvenient for a user because the user can easily answer the question by selecting one of the two buttons (S22).

The terminal processor 25 obtains the foregoing juice extraction information through communication with the juicer regardless of whether or not the user answers the question (S23).

When the user selects 'Yes', the terminal processor 25 records that the user drank the green vegetable juice corresponding to the 'juice extraction information' provided by the juicer 10 'today' in a calendar and allows the user to check the record in person (S24, S25).

The green vegetable juice corresponding to the 'juice extraction information', for example, refers to green vegetable juice as directed in a recipe for green vegetable juice extracted at a juice extraction time, which is the closest to 'today', i.e. juice extraction check time of 'Yes' or 'No'. In this case, the juice extraction time may be used as the most basic information of the juice extraction information. However, even though the juice extraction time is not given, it is possible to generate information about an intake history of green vegetable juice while excluding the juice extraction time from the juice extraction information by providing a recipe for personalized green vegetable juice or a recipe for green vegetable juice recently extracted in the juicer 10, which are selectable if possible, as long as a user answers the second question of 'What kind of green vegetable juice did you drink?'.

Like this, the terminal processor 25 generates the information about the intake history of green vegetable juice in order to get basic information for checking whether a user having the green vegetable juice drinks the green vegetable juice as guided, and whether there is any problem in an intake method of green vegetable juice, and further identifying whether there is a need of changing the recipe for green vegetable juice based on health conditions to be described later.

Below, description will be made with regard to the server 30, and additional description will be made with regard to processes according to the functions of the terminal processor 25 interworking with the server 30.

Referring back to FIG. 1, the server 30 according to an embodiment of the disclosure is to store information and provide resources needed for processing data of which an operation load is large.

Specifically, the server 30 includes a memory stored resources for generating and recommending recipes for personalized green vegetable juice based on personal information about a user's health conditions, in other words, AI software, a high-performance processor for running AI software, and a communication module for data network with the user terminal 20, etc.

It will be described that the terminal processor 25 performs processes to generate the recipe for the personalized green vegetable juice while interworking with the server 30.

Figure 3:
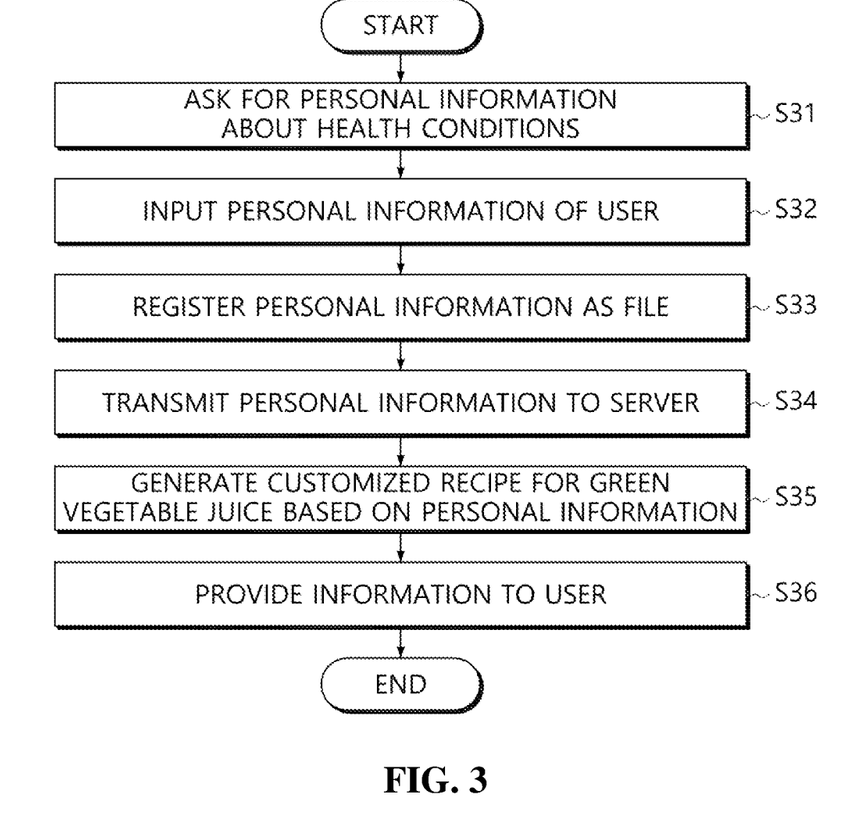
FIG. 3 is a flowchart showing a process of generating a recipe for personalized green vegetable juice according to an embodiment of the disclosure.

FIG. 3 is a flowchart showing a process of generating a recipe for personalized green vegetable juice according to an embodiment of the disclosure.

Referring to FIG. 3, the terminal processor 25 first receives personal information about individual health conditions through the terminal user interface 21.

For example, the terminal processor 25 provides a plurality of inquiry windows activated through the user application for diagnosing health of individuals and allows a user to answer corresponding questions in person, thereby obtaining personal information (S31, S32).

Specifically, the terminal processor 25 may make a general inquiry about disease information or the like including comprehensive personal identity and life pattern, such as age, sex, underlying disease, sleep time, eating habits, etc., and provide a window to which a user can input an answer.

Besides such a question-answer input window, the terminal processor 25 allows a user to input a personal medical certificate for identifying the underlying disease, an image, and a video file in person, thereby collecting various pieces of data (S33).

The obtained personal information is transmitted to the server 30 (S34), and the server 30 applies the personal information to an AI model or a preset algorithm through its own processor, thereby generating recipes for green vegetable juice customized for individuals (S35). Such an AI model is obtained by learning based on a plurality of pieces of previous data about effectiveness that ingredients of specific green vegetable juice have. Further, the learning may progress in such a manner that insufficient data is generated by AI and applied again to the existing model. For example, a recipe for green vegetable juice may be accurately recommended by learning cases of symptom relief when people who are 'epileptic' drinks green vegetable juice of specific ingredients.

Such a generated recipe for personalized green vegetable juice may be provided to a user through the user interface 21, or may be provided to the juicer 10 through the communication module 22 and then provided to a user (S36).

Meanwhile, the terminal processor 25 may set a user group of users who use the juicer 10 while interworking with the server 30, and provide generalized recipes to individual members of the user group.

Figure 4:
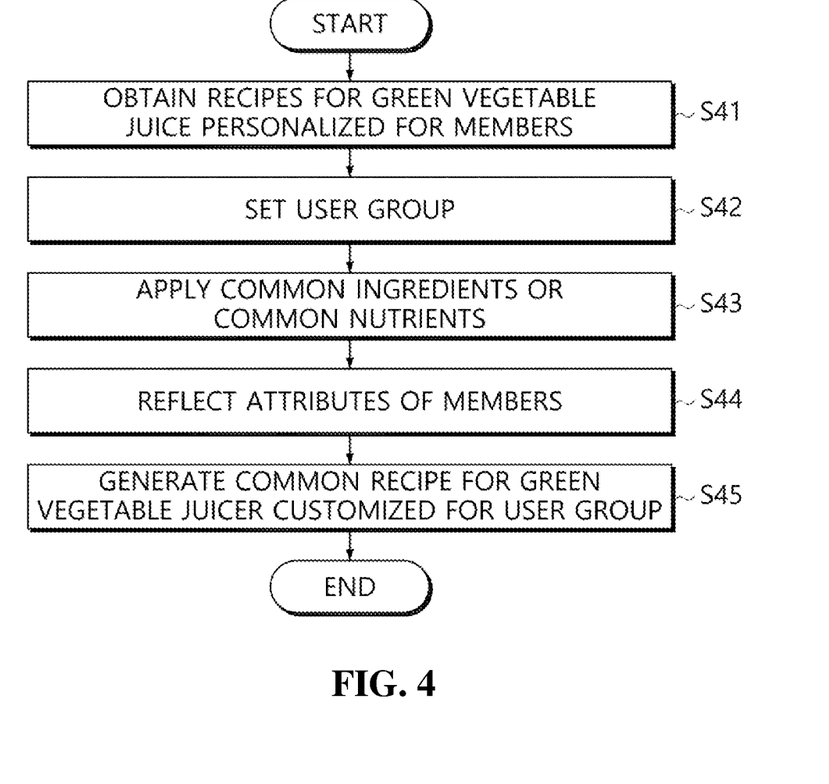
FIG. 4 is a flowchart showing a process of generating a recipe for generalized green vegetable juice of a user group according to an embodiment of the disclosure.

FIG. 4 is a flowchart showing a process of generating a recipe for generalized green vegetable juice of a user group according to an embodiment of the disclosure, and detailed processes will be described below with reference to FIG. 4.

First, the terminal processor 25 receives users' personal information as described above, and obtain the users' recipes for personalized green vegetable juice through the server 30 (S41).

Next, the terminal processor 25 receives a user input related to user group setting (S42). For example, a family of four: son, daughter and father registered to mother's terminal may be set as a user group, or the other three except son may be selectively set as a user group.

Next, a generalized recipe for the user group is generated based on the recipes for personalized green vegetable juice corresponding to members of this group. Here, various reference factors may be taken into account in order to generate the generalized recipe from a plurality of recipes for personalized green vegetable juice, and these factors may be selectively or complexly considered.

For example, the reference factors may be based on overlapped ingredients, i.e. overlapped nutrients between the generated recipes for personalized green vegetable juice (S43).

Here, the attributes of the members may also be taken into account, in which the individualities of the members may include a pattern of priorities, tastes of likes and dislikes, allergic reaction, etc. (S44).

For example, a plurality of members are prioritized. For instance, priority is given according to the attributes of the members such as a member with special disease, an aged member, a member of an examinee, etc., and the recipe for green vegetable juice customized for a member who has high priority may be added as a base.

On the other hand, when the members need to avoid components or ingredients because of allergies or specific disease, a recipe for generalized green vegetable juice may be generated to exclude such ingredients. Further, ingredients the individual likes or dislikes are reflected in the recipe, thereby raising the whole user group's preference to the green vegetable juice.

Therefore, ultimately, a generalized recipe for the user group is generated based on the recipes for personalized green vegetable juice of the members in this group, in other words, by combining these recipes (S45).

There may be a single user group or a plurality of user groups of users who use the foregoing juicer 10. When the juicer 10 is used at home, all members of a family may be generally grouped into a single user group, but may be grouped into a plurality of user groups by subdivisional references to thereby generate recipes for generalized green vegetable juice according to the plurality of user groups.

As described above, the terminal processor 25 provides a recipe optimized for the whole user group as a recipe applicable to users who share the juicer 10, and therefore a user only need to make the green vegetable juice once to be shared in common by all the family without hassle of preparing ingredients one by one corresponding to individuals, extracting juice, cleaning the juicer 10, and separately keeping the green vegetable juice, thereby guaranteeing both convenience in use and heath of the family. Further, it will be appreciated that some functions of the terminal processor 25 may be performed in the server 30.

In another functional aspect of the terminal processor 25, a calibration function for a recipe for personalized green vegetable juice will be described again.

Figure 5:
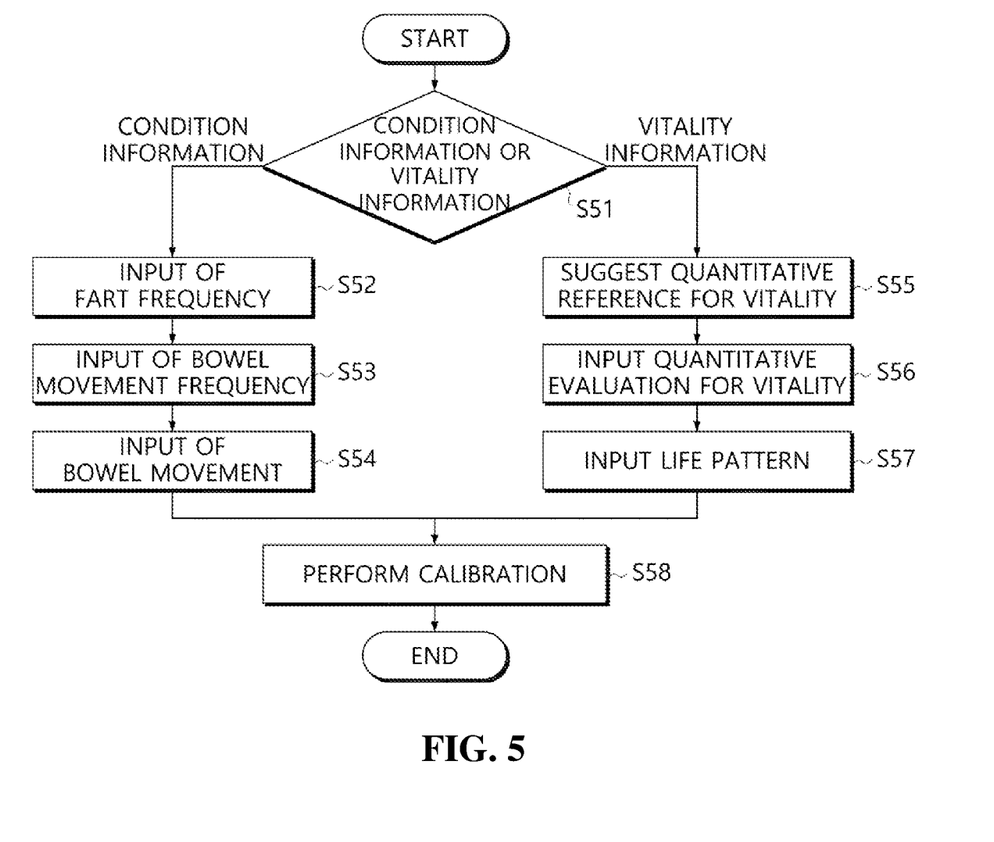
FIG. 5 is a flowchart showing a process of calibrating a recipe for personalized green vegetable juice according to an embodiment of the disclosure.

FIG. 5 is a flowchart showing a process of calibrating a recipe for personalized green vegetable juice according to an embodiment of the disclosure.

Referring to FIG. 5, the terminal processor 25 may partially change a preset recipe for personalized green vegetable juice based on some references (S51).

Here, some references refer to some major pieces of information for guessing a user's health condition, and are broadly classified into condition information and vitality information.

The condition information includes at least one of a user's fart frequency, bowel movement frequency, or bowel movement, which may be input by a user in person as a question-answer form like the personal information input window as described above (S52~S54).

The vitality information refers to a quantitative numerical value or a qualitative life pattern input by a user, which may be obtained based on a user input through the user interface 21 (S55-S57). For example, it is possible to evaluate activity by a method of allowing a numeral of vitality to be selected along with an inquiry of 'How rate your vitality on a scale from 1 to 10' (S55, S56) or allowing 'office, home, study room, school, playground, fitness center, etc.' to be selected along with an inquiry of 'Where do you spend time these days?' (S57).

Thus, the calibration of the terminal processor 25 includes at least one of modification in a mixture ratio of input ingredients included in a recipe, change in the input ingredients, or change in intake or frequency of green vegetable juice (S58).

Figure 6:
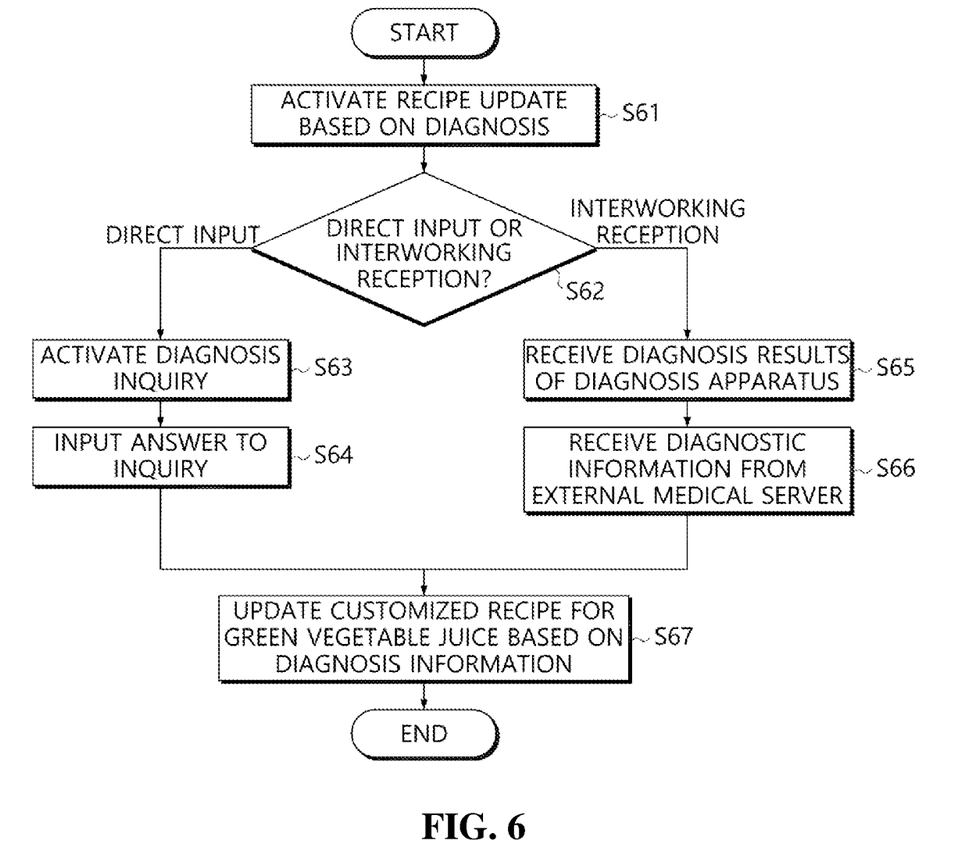
FIG. 6 is a flowchart showing a process of providing a recipe for green vegetable juice newly customized based on change in health conditions by green vegetable juice intake according to an embodiment of the disclosure.

FIG. 6 is a flowchart showing a process of providing a recipe for green vegetable juice newly customized based on change in health conditions by green vegetable juice intake according to another embodiment of the disclosure.

Referring to FIG. 6, the terminal processor 25 generates an active window for self-diagnosis (S61).

According to selection of a user through the active window (S62), an inquiry is made again with regard to some pieces of the personal information (non) periodically questioned at an initial stage based on the intake history of green vegetable juice, and information about change in the personal information (S63, S63).

In this case, a user inputs the health conditions based on the self-diagnosis, but health change caused by the green vegetable juice intake is accumulatively recorded with many evaluations and inquiries The self-diagnosis information may be obtained from various external diagnosis apparatuses, for example, a blood glucose meter, a sphygmomanometer, a scale, etc. (S65), or may be obtained based on personal medical information provided from an external medical server 30 or medical information directly interworked by individuals (S66).

The server 30 generates a newly customized recipe for green vegetable juice by applying such self-diagnosis information to an AI model, and provides the newly customized recipe to the terminal processor 25, and the terminal processor 25 provides this recipe to a user through the user interface 21 (S67).

As above, the element blocks of the system for the smart juicer 10 shown in FIG. 1 and organic operations between these blocks have been described according to functional processes.

Below, a method of operating the smart juicer system 1 according to another embodiment of the disclosure will be described in terms of time series.

Figure 7:
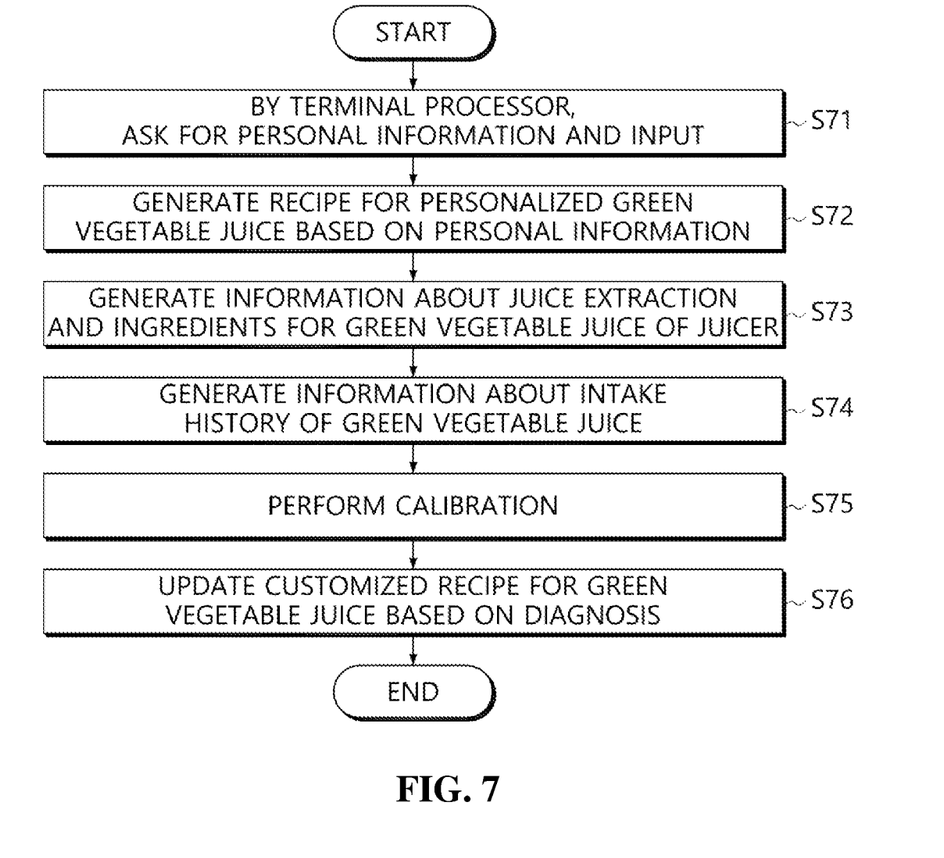
FIG. 7 is a flowchart showing an operating method of a smart juicer system according to an embodiment of the disclosure.

FIG. 7 is a flowchart showing an operating method of a smart juicer system according to still another embodiment of the disclosure.

Referring to FIG. 7, the terminal processor 25 asks for the personal information about the health condition and receives an answer from a user through an app installed in the user terminal 20 (S71). The input information may be stored in the user terminal 20 and transmitted to the server 30. As described above, the personal information may be classified into information about general identities such as age, sex, job, etc. and information directly related to the health condition, and the information highly directly related to the health condition may be used as items to be questioned again at the inquiry for the foregoing self-diagnosis The server 30 generates a recipe for personalized green vegetable juice with regard to a user based on the personal information (S72). Here, the server 30 includes an algorithm or AI model capable of generating a customized recipe for green vegetable juice in response to an input of the personal information, and the AI model may be established by subdivision and learning based on the effectiveness of the green vegetable juice. An input for the AI model may include age, sex, disease, peculiar health conditions, e.g. bowel movements, blood coagulation, distribution and movement of red and white blood cells, and the like information, and a recipe for green vegetable juice customized for the input is provided as a result.

A user makes green vegetable juice while following the given customized recipe and drinks the green vegetable juice (S73). Thus, the terminal processor 25 in the user terminal 20 continuously generates information about the intake history of the green vegetable juice (S74). Like the foregoing embodiment, the generated information may be collected in such a manner that the push message is used to ask a user and receive his/her answer. However, it may also possible to collect the information about the intake history of the green vegetable juice by obtaining information about whether there is a calendar record written by a user or whether the green vegetable juice remains in a container (not shown) for storing the green vegetable juice (or by obtaining information based on the received image or weight information).

According to the foregoing embodiments, the juicer 10 makes green vegetable juice by extracting the juice from input ingredients while following the recipe for personalized green vegetable juice, and generates the juice extraction information including at least one among elapsed time of making the green vegetable juice, identification information about input ingredients, juice extraction conditions, and a recipe for personalized green vegetable juice. Thus, the generation of the information about the intake history of the green vegetable juice includes generation of the information about the intake history of the green vegetable juice based on information about an intake time when a user drinks the green vegetable juice, and the juice extraction information of the made green vegetable juice.

Such accumulated intake history information about the green vegetable juice is stored in such a manner that information about intake time, i.e. information about a date unit on a calendar is stored together with what recipe the green vegetable juice drunk by a user is made from.

The terminal processor 25 collects a user's condition information or vitality information (non) periodically or based on a user's selection as necessary, and performs calibration with regard to the recipe for personalized green vegetable juice by reflecting the collected condition information or vitality information (S75). The calibration based on the input information is performed based on the foregoing AI learning model, and the input and output is used for the same model.

Likewise, the server 30 updates the customized recipe for green vegetable juice with not simple condition information but diagnosis information directly connected to health conditions, i.e. information input by a user in person or medical diagnostic information provided by an external apparatus/medical institution, thereby verifying intake effectiveness of green vegetable juice and providing a new optimum recipe mirroring the effectiveness (S76).

According to the disclosure, various pieces of data about individuals and green vegetable juice are generated and processed, and information is generated based on such data, thereby providing green vegetable juice intake optimized for a user individual and/or user group and noticeable improvement in health.

The operation method of smart juicer system of the present disclosure may be implemented in the form of a processor-readable code stored in a processor-readable recording medium that can be read by the processor of the smart juicer system. The processor-readable recording media include all kinds of recording devices that store data that can be read by a processor. Specific examples of the processor-readable recording medium include a ROM, a RAM, a CD-ROM, a magnetic tape, a floppy disk, an optical data storage device, and the like. The processor-readable recording medium may be implemented in the form of a carrier wave for transmission of a signal over the Internet. The processor-readable recording medium may also be distributed over computer systems connected via a network, and the code may be stored and executed in the distributed processor-readable recording medium. Although a few embodiments have been shown and described, it will be appreciated by those skilled in the art that replacements or changes may be made in these embodiments without departing from the principles and spirit of the invention, the scope of which is defined in the appended claims and their equivalents.

What is claimed is:

1. A smart juicer system comprising:
a juicer configured to make green vegetable juice by extracting juice from input ingredients, and generate juice extraction information comprising at least one of time information about the juice extraction, identification information about the input ingredients subjected to the juice extraction, a recipe based on the juice extraction, or making conditions of the juice extraction; and
a user terminal comprising a user interface for receiving an input about whether a user drinks green vegetable juice, a communication module for data communication with the juicer, and a terminal processor configured to generate information about the user's intake history of green vegetable juice based on intake information and the juice extraction information obtained from the juicer through the communication module, wherein the juicer comprises a container comprising partitioned spaces partitioned by partition walls where a plurality of heterogeneous input ingredients are placeable in the partitioned spaces, an image sensor positioned at the container to capture an image of the input ingredients, and a juicer processor configured to identify identification information about the input ingredients based on the image by dividing the image according to the partitioned spaces.

2. The smart juicer system according to claim 1, wherein the juicer comprises a weight sensor configured to measure weight of the container, wherein the weight sensor comprises load cells distributively installed under the container so as to separately calculate total weight and weight of each one of the partitioned spaces.

3. The smart juicer system according to claim 1, wherein the image sensor is installed in an inlet for the input ingredients to be subjected to the juice extraction and captures an image when the input ingredients are put into the inlet.

4. The smart juicer system according to claim 1, wherein the terminal processor is configured to provide an inquiry about the intake to a user and receive intake check information from the user through the user interface, and the terminal processor is configured to specify information about the green vegetable juice drunk by the user by comparing the intake check information and the juice extraction time and generate information about an intake history of the green vegetable juice.

5. The smart juicer system according to claim 1, further comprising a server configured to recommend a recipe for personalized green vegetable juice based on personal information, wherein the terminal processor is configured to receive the recipe for personalized green vegetable juice by providing the personal information input through the user interface to the server, and provide the received recipe for personalized green vegetable juice to the user through the user interface or the juicer through the communication module.

6. The smart juicer system according to claim 5, wherein the terminal processor or the server is configured to prepare recipes for personalized green vegetable juice for members of a user group into which a plurality of users who share the juicer are grouped, and generates a common recipe customized for the user group based on the recipes for personalized green vegetable juice for the respective members.

7. The smart juicer system according to claim 6, wherein the terminal processor or the server is configured to generate a common recipe customized for the user group based on overlapped ingredients from the recipes for personalized green vegetable juice for the respective members.

8. The smart juicer system according to claim 6, wherein the terminal processor or the server is configured to generate a common recipe customized for the user group based on a recipe for green vegetable juice personalized for a member having high priority according to preset priorities of the members in the user group.

9. The smart juicer system according to claim 6, wherein the members are grouped into a plurality of user groups and a common recipe customized for each of the user groups is generated, based on common attributes between the members of the user group or the recipe respectively personalized for the members.

10. The smart juicer system according to claim 5, wherein the terminal processor is configured to receive a user's vitality or condition information through the user interface, and perform calibration with regard to the recipe for personalized green vegetable juice based on the user's vitality or condition information.

11. The smart juicer system according to claim 10, wherein the calibration comprises at least one of modification in a mixture ratio of input ingredients included in the recipe, change in the input ingredients of the recipe, or change in intake or frequency of the recipe for personalized green vegetable juice.

12. The smart juicer system according to claim 10, wherein the condition information comprises at least one of a user's fart frequency, bowel movement frequency, or bowel movement.

13. The smart juicer system according to claim 10, wherein the vitality information comprises information about a qualitative life pattern or a quantitative numerical value or input by a user.

14. The smart juicer system according to claim 1, wherein the terminal processor is configured to receive diagnosis information about intake results of the green vegetable juice from the user through the user interface.

15. The smart juicer system according to claim 1, wherein the terminal processor is configured to obtain diagnosis information comprising at least one of blood pressure, blood glucose, or blood state from an external diagnosis apparatus or an external medical server.

\* \* \* \* \*